United States Patent [19]

Ross

[11] Patent Number: 4,933,927
[45] Date of Patent: Jun. 12, 1990

[54] DISK CENTERING METHOD AND APPARATUS FOR CENTERING DISKS FOR DISK DRIVES

[75] Inventor: John P. Ross, Cupertino, Calif.

[73] Assignee: Conner Peripherals, Inc., San Jose, Calif.

[21] Appl. No.: 315,148

[22] Filed: Feb. 24, 1989

[51] Int. Cl.$^5$ .................... G11B 23/00; G11B 25/04
[52] U.S. Cl. .................................. 369/270; 29/406; 33/644; 360/98.08; 360/99.12
[58] Field of Search ................ 369/270, 271, 34, 36, 369/38, 75.2; 360/99.08, 99.12, 98.07, 98.08, 99.03, 97.01, 99.05; 29/406; 33/643, 632, 644, 520; 76/79

[56] References Cited

U.S. PATENT DOCUMENTS

| | | | |
|---|---|---|---|
| 3,477,727 | 11/1969 | O'Connell | 369/207 |
| 4,125,883 | 11/1978 | Rolph | 360/99.05 |
| 4,689,782 | 8/1987 | Tsuchiya et al. | 369/279 |
| 4,709,283 | 11/1987 | Kitahara et al. | 360/99.02 |
| 4,764,828 | 8/1988 | Gollbach | 360/98.08 |
| 4,797,873 | 1/1989 | Nobutani | 360/99.08 |
| 4,825,314 | 4/1989 | Maekawa et al. | 369/271 |
| 4,839,880 | 6/1989 | D'Alayer de Costenore | 369/75.2 |

Primary Examiner—Steven L. Stephan
Assistant Examiner—Kenneth Wells
Attorney, Agent, or Firm—Fliesler, Dubb, Meyer & Lovejoy

[57] ABSTRACT

A method of centering a disk on a disk drive motor with respect to the rotational axis of the motor and/or for balancing the disk to reduce operating vibration of the disk and motor assembly. The centering/balancing method is performed by placing a contact element in contact with the outer diameter of the disk and moving the contact element towards the rotational axis of the motor until the inner diameter of the disk contacts a portion of the hub of the motor which protrudes into the center hole of the disk. Then, the disk is rotated while the contact element is simultaneously moved away from the rotational axis of the motor at a rate related to the rotational speed of the disk. An apparatus for performing the centering/balancing methods includes an element for contacting the outer diameter of the disk, and a mechanism for moving the contact element towards the rotational axis of the motor until the inner diameter of the disk contacts the portion of the hub protruding into the hole in the disk and for simultaneously rotating the disk and moving the contact element away from the rotational axis of the motor at a rate related to the rotational velocity of the disk.

17 Claims, 5 Drawing Sheets

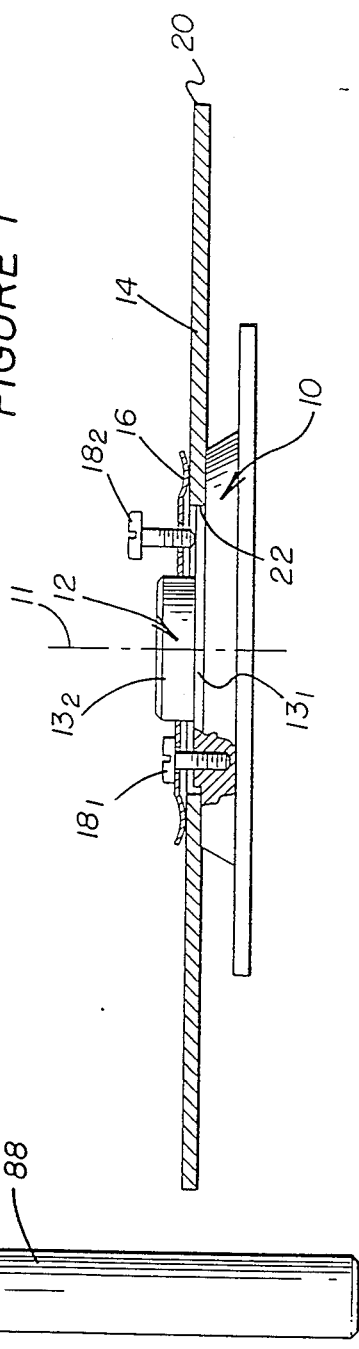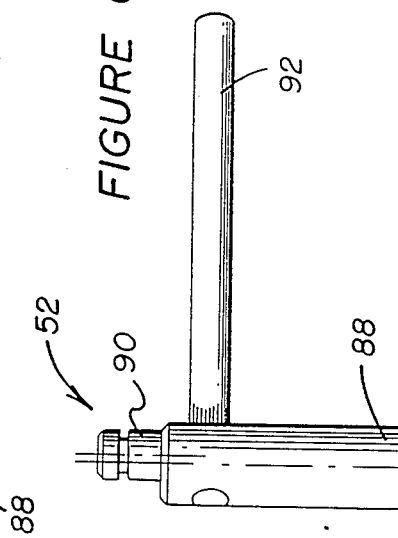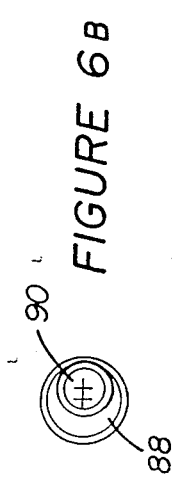

DISK CENTERING METHOD AND APPARATUS FOR CENTERING DISKS FOR DISK DRIVES

BACKGROUND OF THE INVENTION

1. Field of the Invention

The present invention relates to a method of centering a disk for a disk drive on the hub of a disk drive motor and an apparatus for performing disk centering.

2. Description of the Related Art

Motors in disk drives usually spin the disk mounted on the motor at approximately 3600 rpm. The sensitivity of disk drives to vibration requires that the disk and motor assembly be balanced so that the motor assembly does not vibrate beyond a specified degree during operation of the disk drive. The disk and motor are usually balanced with weighted screws threaded into the motor or by using other weighting methods.

FIG. 1 illustrates a disk drive motor 10 having a hub 12. Hub 12 has a first hub portion $13_1$ which protrudes into the center hole of disk 14 and a second first hub portion $13_2$ which protrudes through the center hole of disk 14 and through disk clamp 16. Disk 14 is secured to motor 10 by disk clamp 16 and screws $18_{1-2}$. Disk 14 has a ring-like shape with an outer diameter 20 and an inner diameter 22; inner diameter 22 defines the center hole of disk 14.

If weighted screws are to be added for balancing, more holes than are necessary to hold disk 14 in place are provided in the hub 12 of motor 10 and the weighted screws are threaded into the extra holes to balance disk 14. In addition, screws 18, which are usually all of the same weight, may be replaced with screws of varying weights during the balancing process. As used herein, "hub" means the rotating portion of a disk drive motor. The balancing procedure is conventionally performed by spinning the disk, detecting an out-of-balance condition, providing screw(s) of the appropriate weight in the appropriate hole(s) in the hub, and repeating the procedure until the disk is balanced. Alternatively, weight can be added in different manners (e.g., by placing lead tape on the hub 12 or disk 14).

Several problems are associated with the conventional balancing procedure. First, the balancing procedure is time and labor intensive, and extremely difficult to automate. Second, the efforts associated with the balancing procedure are often wasted because of poor disk placement relative to the hub 12, particularly first hub portion $13_1$ which protrudes into the center hole in disk 14. If the disk 14 is not centered on the hub 12, a portion of inner diameter 22 of disk 14 is closer to first hub portion $13_1$ than the remaining portions of inner diameter 22; in some cases a portion of inner diameter 22 may even contact first hub portion $13_1$. The clearance between inner diameter 22 of disk 14 and first hub portion $13_1$ is on the order of 0.0004 to 0.008 inches, and therefore manually locating disk 14 to prevent contact with first hub portion $13_1$ is difficult if not impossible. The problems associated with centering the outer diameter 20 of the disk 14 relative to the axis 11 of motor 10 are compounded by runout of motor 10 and non-concentricity of outer diameter 20 and inner diameter 22 of disk 14.

Thermal expansion of hub 12 and/or thermal contraction of disk 14 will cause a portion of hub 12 and disk 14 to contact one another, if they are not already in contact. Contact between disk 14 and first hub portion $13_1$ causes disk 14 to move relative to hub 12, placing disk 14 in an out-of-balance condition. This thermal expansion/contraction problem is enhanced by the different coefficients of thermal expansion of the disk material and the hub material, e.g., the aluminum-based disk and steel-based motor hub, and the difficulty in placing disk 14 on hub 12 without contact between first hub portion $13_1$ and disk 14.

SUMMARY OF THE INVENTION

It is, therefore, an object of the present invention, to balance a disk by centering a disk with respect to the rotational axis of a motor.

A further object of the present invention is to automate the disk centering and/or balancing processes.

Another object of the present invention is to provide a method of centering a disk with respect to the rotational axis of a motor so that the outer diameter of the disk has a runout which is less than a specified value.

Another object of the present invention is to provide an apparatus which performs disk centering and/or balancing operations.

Another object of the present invention is to provide a disk balancing process which does not require the addition of weight to the motor and disk assembly.

A method, in accordance with the present invention, of centering a disk on the rotational axis of a motor, the motor having a hub protruding into a center hole in the disk, the disk having an outer diameter and an inner diameter, includes the steps of (a) placing an element in contact with the outer diameter of the disk, (b) moving the element towards the rotational axis of the motor until a portion of the inner diameter contacts the hub, and (c) simultaneously rotating the disk and hub and moving the contact element away from the rotational axis of the motor until the contact element no longer contacts the disk after said step (b).

An apparatus for centering a disk on the rotational axis of a motor having a hub protruding into a center hole of the disk, the disk being loosely fixed to the hub and having an outer diameter and an inner diameter defining the center hole, comprises first means for contacting the outer diameter of the disk, and second means for moving said first means toward the rotational axis of the motor until the inner diameter of the disk contacts the hub and for simultaneously rotating the disk and hub and moving the first means away from the rotational axis of the motor at a rate related to the rotational velocity of the disk.

BRIEF DESCRIPTION OF THE DRAWINGS

FIG. 1 is a partial, cross-sectional view of a disk drive motor having a disk mounted thereon;

FIG. 6A and B are side and top views, respectively, of an eccentric which forms a part of the apparatus of the present invention.

DESCRIPTION OF THE PREFERRED EMBODIMENT(S)

Figure 2A:
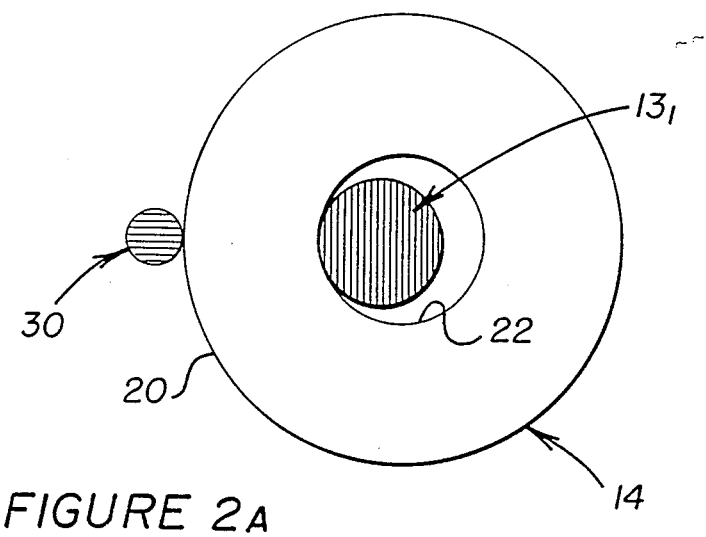
FIGS. 2A and B are plan views of a disk and the hub of a disk drive motor for describing the method of the claimed invention.

The disk centering method and apparatus for centering disks for disk drives in accordance with the present invention will be described with reference to FIGS. 1-6. In particular, the method of the present invention will be described broadly with reference to FIGS. 1 and 2A-B and the method and the apparatus will be described in detail with reference to FIGS. 1 and 3-6.

The purposes of the method of the present invention include centering the outer diameter 20 of disk 14 on axis 11 of motor 10, allowing for space between the hole in disk 14 and hub 12 (particularly first hub portion $13_1$) and/or to balance disk 14. The centering operation of the present invention is dependent on the trueness of outer diameter 20 of disk 14, and the balancing operation of the present invention is dependent on the trueness of outer diameter 20 and the balance of motor 10. The balancing operation of the present invention may be combined with conventional balancing using weighted screws.

Figure 2B:
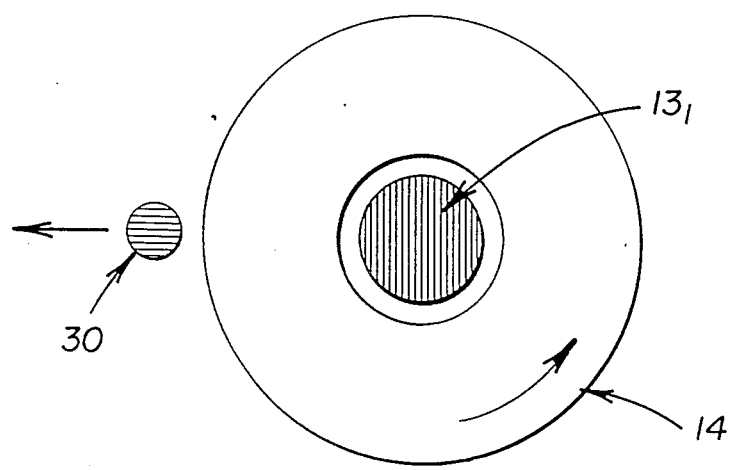

The disk centering method, as shown in FIGS. 2A-B, is performed in the following manner. Disk 14 is mounted on hub 12 with a disk clamp 16, as shown in FIG. 1. Then, disk 14 is loosely fixed to motor 10. As used herein, "loosely fixed" means that disk 14 may be moved relative to hub 12 by the application of a small force, but is sufficiently secured so that the disk 14 will not move under normal circumstances, for example, during rotation of the disk 14 and hub 12. A contact element 30 is brought into contact with the outer diameter 20 of disk 14, and then moved toward the rotational axis 11 of motor 10 and hub 12 until inner diameter 22 of disk 14 contacts first hub portion $13_1$. Then, disk 14 is rotated and, simultaneously, contact element 30 is moved away from the rotational axis 11 of motor 10 at a rate related to the rotational speed of disk 14. Assuming that disk 14 is round, contact element 30 will contact outer diameter 20 of disk 14 until outer diameter 20 of disk 14 is centered relative to rotational axis 11; in addition, if inner diameter 22 is substantially concentric with outer diameter 20, the entire circumference of inner diameter 22 of disk 14 will be spaced from first hub portion $13_1$. Providing a space between inner diameter 22 and hub 12 avoids the thermal expansion/contraction problem. After the contact element 30 no longer contacts outer diameter 20 of disk 14, the rotation of disk 14 is stopped and screws 18 are tightened to rigidly secure disk 14 to hub 12.

Contact element 30 forces the portion of disk 14 between contact element 30 and first hub portion $13_1$ towards axis 11, and because disk 14 is loosely fixed to hub 12, disk 14 moves relative to hub 12 under the force of contact element 30. The outer diameter 20 of disk 14 is closest to first hub portion $13_1$ at the point where outer diameter 20 and contact element 30 are in contact. Thus, the other portions of outer diameter 20 have a larger effective radius and are forced towards first hub portion $13_1$ as they are rotated past contact element 30. As contact element 30 moves away from rotational axis 11 (i.e., as the distance between contact element 30 and first hub portion $13_1$ increases) in a linear relationship with the rotation of disk 14, each portion of disk 14 is forced towards first hub portion $13_1$ until the distance between outer diameter 20 and axis 11 is approximately uniform for the entire circumference of disk 14. At this point in the process, contact element 30 no longer contacts disk 14.

The disk 14 is rotated at rotational speeds varying from approximately 50 to approximately 100 rpm; however, smaller and larger numbers of revolutions per minute may be utilized, provided that the rate of movement of contact element 30 has the appropriate relationship with the rotational speed of disk 14. The rotational speed selected is based on a balancing of factors including the speed at which the centering/balancing process is performed (slower speeds mean slower but more accurate processing), and the desire to reduce vibration during the process (higher speeds provide faster processing but may increase vibration to unacceptable levels).

The inventor has determined that a disk for a 3 ½ inch form factor disk drive can be out-of-balance if the center of gravity is approximately 0.00025 inches or greater off center with respect to axis 11. An off-center measurement of approximately 0.00025 inches is equivalent to a total indicator runout ("runout") of approximately 0.0005 inches for the outer diameter of the disk 14 about the rotational axis 11 of motor 10. Accordingly, the inventor sought to achieve a runout of the outer diameter 20 of disk 14 of less than approximately 0.0004 inches. To achieve this runout on a consistent basis, it was determined that contact element 30 should be moved away from hub 12 at a rate of approximately 0.0004 inches per revolution of disk 14. This rate of movement of contact element 30 consistently produces a runout for the outer diameter 20 of disk 14 which is less than approximately 0.0004 inches.

The rate of withdrawal R of contact element 30 per revolution of disk 14 is approximately equal to or less than the desired runout because of the linear relationship between the movement of contact element 30 and the rotational speed of disk 14. On the other hand, if a stepwise relationship exists (i.e., if contact element moved a specified distance only at one point during each rotation of disk 14), the withdrawal rate R would be required to be one-half of the desired runout of outer diameter 20.

Figure 3:
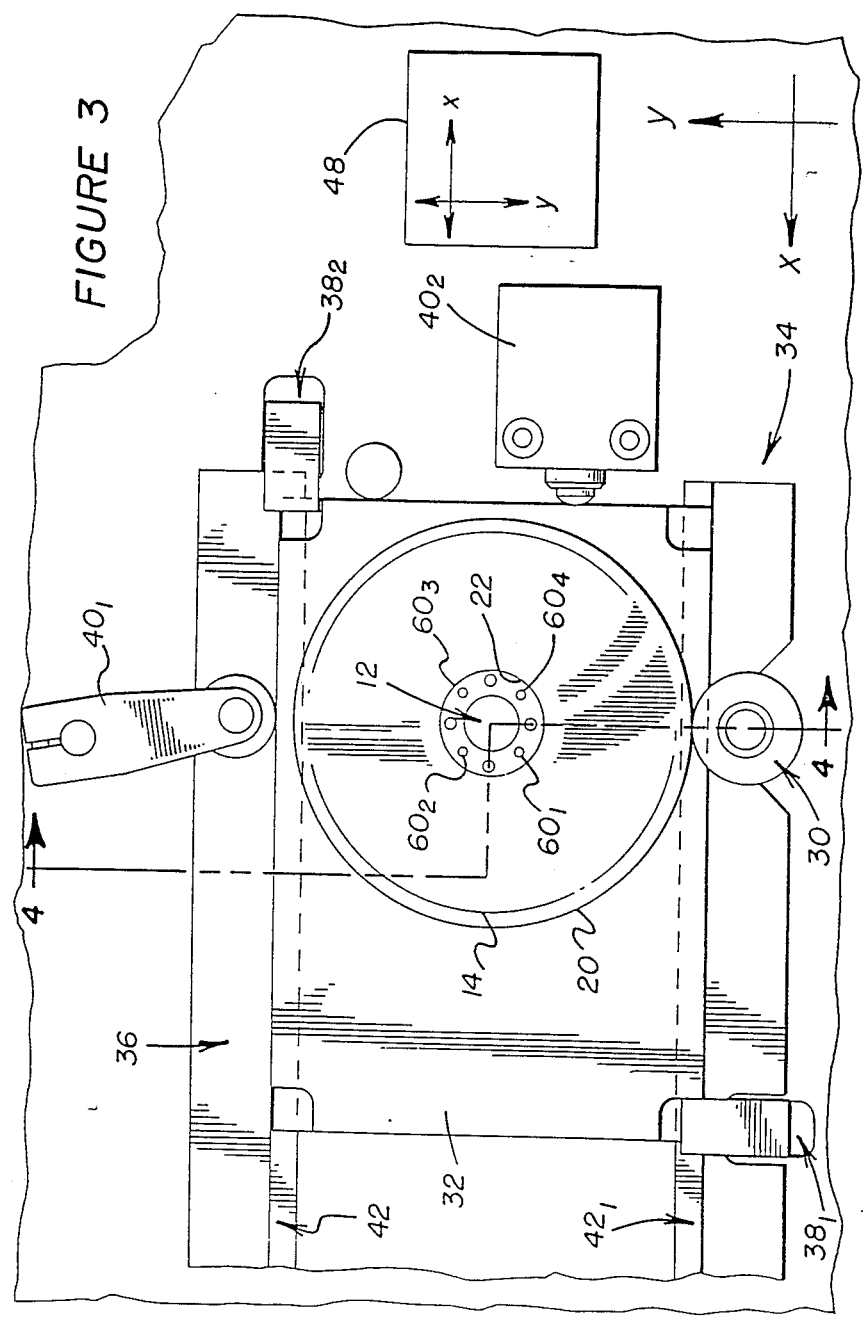
FIG. 3 is plan view of an apparatus in accordance with the present invention for centering a disk on the rotational axis of a motor.
Figure 4:
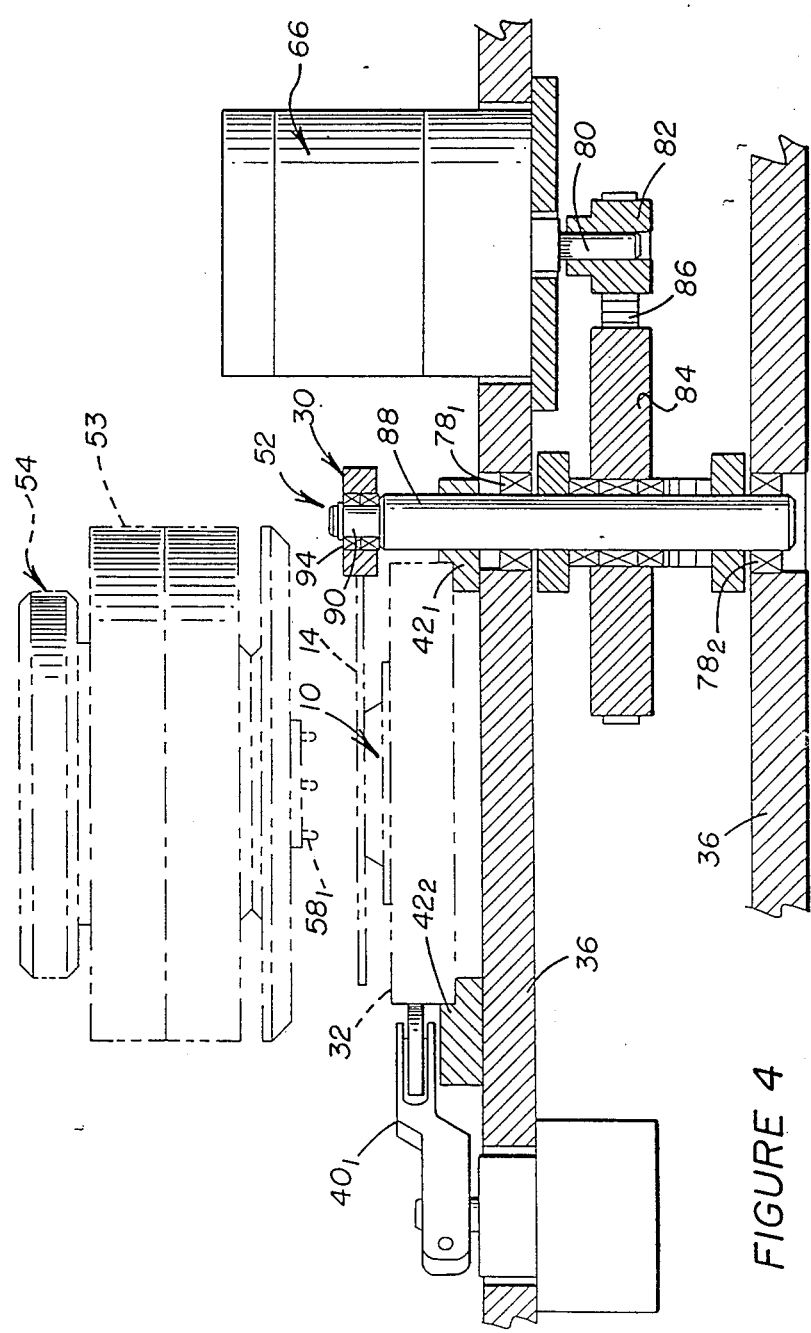
FIG. 4 is a sectional view along line 4—4 in FIG. 3.
Figures 5A, 5B:
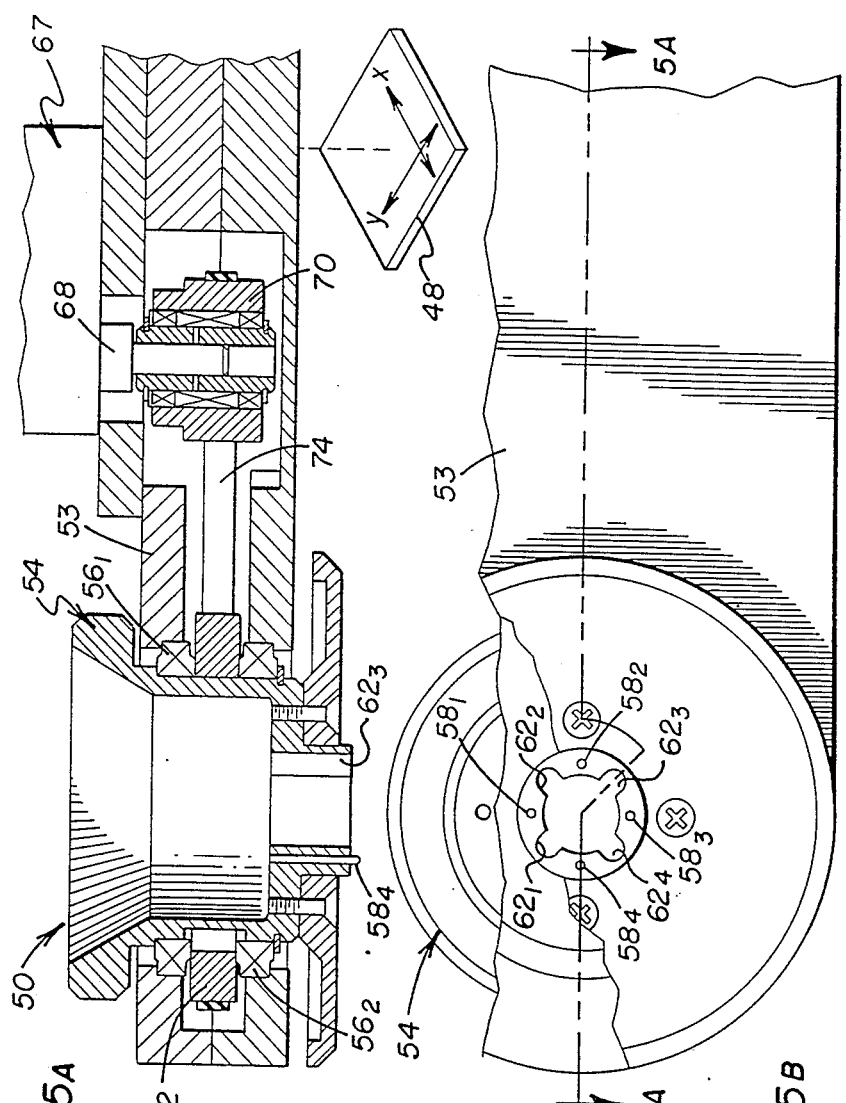
FIG. 5A and B are sectional and partial cutaway views, respectively, of a drive arm of an apparatus for disk centering in accordance with the present invention with FIG. 5A being a section along line 5A—5A in FIG. 5B.

An apparatus 34 for centering disks in accordance with the above-described method is illustrated in FIGS. 3-6. The apparatus 34 for centering disks in accordance with the present invention is designed to center a disk 14 on a motor 10 which is mounted on the base 32 of a disk drive (not shown). Mounting the motor 10 on base 32 prior to performing the centering/balancing operation allows base 32 to be used to support motor 10. Base 32 slides into apparatus 34 on rails $42_{1-2}$ (FIGS. 3 and 4). Spring-loaded compliant element 401 allows movement of baseplate 32 in the y direction and forces outer diameter 20 of disk 14 into contact with contact element 30. Then, clamps $38_{1-2}$ are tightened to secure opposed corners of baseplate 32 with respect to support table 36. The location of base 32 in the y axis direction is not critical as long as the base is securely positioned and the outer diameter 20 of disk 14 is within the range of motion of contact element 30 throughout the centering-/balancing operation. However, it is desirable to have the center axis of contact element 30 approximately aligned with the axis 11 of motor 10. Clearly, many different structures may be utilized to secure base 32 to the disk centering apparatus 34; thus, the locating and securing structures illustrated in FIG. 3 are intended only as examples of such structures.

Disk centering apparatus 34 includes two main elements which interact to perform the disk centering method. Drive mechanism 50 (FIG. 5) rotates disk 14 and hub 12, and eccentric unit 52 (FIGS. 4 and 6) moves contact element 30 with respect to axis 11. Drive mechanism 50 is mounted on support table 36 by an x-y table 48 (FIG. 3) to allow drive head 54 to be aligned with motor 10. Further, drive arm 53 pivots between a position where drive head 54 is engaged with hub 12 and a position where drive head 54 is disengaged from hub 12. Drive arm 53 is maintained in the engaged position by gravitational force. Alternatively, drive mechanism 50 can be fixed and base 32 and motor 10 can be aligned with the drive mechanism 50. For example, base 32 can be mounted on a floating table which is locked in place after motor 10 is aligned with a fixed drive mechanism.

Drive head 54 is rotatably mounted in drive arm 53 by first and second bearings $56_{1-2}$. Pins $58_{1-3}$ engage drive holes $60_{1-4}$ in hub 12 and disk clamp 16. Drive head 54 is also provided with recesses $62_{1-4}$ which provide access to screws 18 in hub 12 when drive head 54 is engaged with hub 12.

Disk 14 is loosely fixed to hub 12 by the downward force of drive mechanism 50 on disk clamp 16. A gravitational force of approximately 5 lbs. is provided by drive mechanism 50 and this force is sufficient to create enough friction so that disk 14 will rotate with hub 12 while allowing disk 14 to move laterally during the center/balancing process. This force also holds disk 14 in place while screws 18 are tightened to securely fix disk 14 to hub 12.

Eccentric element 52 includes a first shaft portion 88 and a second shaft portion 90. Shaft 88 is mounted on support table 36 by first and second bearings $78_{1-2}$. Second shaft portion 90 has a smaller diameter than first shaft portion 88 and the center axis of second shaft portion 90 is offset with respect to the center axis of first shaft portion 88. The offset in the center of first and second shaft portions 88, 90 causes contact element 30, which is provided on second shaft portion 90, to have a cam action when shaft 88 is rotated, and thus to move away or towards axis 11 of motor 10 depending on the portion of the rotational cycle of shaft 88.

Contact element 30 is precisely machined from a material which is hard enough to be machined and to retain its shape, but soft enough so that it does not damage disk 14. The material for contact element 30 may be, for example, Delran. A precision bearing 94 is used to mount contact element 30 to shaft portion 90 of eccentric 52. Other low-friction, non-abrading elements may be used to contact outer diameter 20.

A lever 92 is provided on shaft 88 of eccentric element 52 so that contact element 30 may be brought into contact with outer diameter 20 of disk 14 rapidly. The rapid rotation of eccentric element 52 facilitates the insertion and removal of baseplate 32 from the disk centering apparatus 34. Contact element 30 may also be mounted on mechanisms, other than an eccentric, (for example, a slide driven by a lead screw) which provide lateral motion of contact element 30 at the appropriate rate.

First and second synchronous motors 66, 67 operate drive mechanism 50 and eccentric element 52. Motor 67, provided on drive mechanism 50, drives shaft 68; shaft 68 turns first pulley 70 which is interconnected to second pulley 72 on drive head 54 by belt 74. Motor 66 is provided on support table 36 and drives shaft 80. Shaft 80 turns a third pulley 82 which is interconnected with a fourth pulley 84 on eccentric element 52 by belt 86. Fourth pulley 84 has a substantially larger diameter than third pulley 82 so that there is a large reduction in the rotating speed of eccentric 52 with respect to the rotating speed of shaft 80. The synchronous operation of motors 66 and 67 with respect to each other and with respect to the frequency of the AC current operating motors 66, 67 provides the control necessary to relate the rotational speed of disk 14 and the movement of contact element 30. Synchronous motor 66, 67 may be replaced by, for example, computer-controlled stepper motors.

The ratios of the first and second pulleys, 70, 72 and the ratio of the third and fourth pulleys 82, 84 are selected so that the rotating element 30 moves away from hub 12 at a rate which is related to the rotational speed of disk 14. To provide a runout of less than 0.0004 inches, the rate of movement or withdrawal of rotating element 30 is approximately equal to or less than 0.0004 inches per revolution of disk 14. The inventor has determined that a desired value of runout for outer diameter 20 of disk 14 can be consistently accomplished by having the rotating element 30 move away from hub 12 at a rate R, where R is a distance per revolution, which is approximately equal to or less than the desired runout.

The many features and advantages of the centering/balancing method and the apparatus for performing same in accordance with the present invention will be apparent to those of ordinary skill in the art from the foregoing description and the drawings. Accordingly, the following claims are intended to cover all modifications and equivalents falling within the scope of the invention.

What is claimed is:

1. A method of centering a disk on the rotational axis of a motor, the motor having a hub protruding into a center hole in the disk, the disk having an outer diameter and an inner diameter, the inner diameter defining the center hole, comprising the steps of:
    (a) placing a contact element in contact with the outer diameter of the disk;
    (b) moving the contact element towards the rotational axis of the motor until a portion of the inner diameter contacts the hub; and
    (c) simultaneously rotating the disk and the hub and moving the contact element away from the rotational axis of the motor after said step (b) until the contact element no longer contacts the disk.

2. A method according to claim 1, wherein said step (c) comprises moving the element away from the hub at a rate of R inches per revolution where R is approximately equal to or less than the desired runout of the outer diameter of the disk.

3. A method according to claim 2, wherein said step (c) comprises moving the element away from the rotational axis of the motor at a linear rate R.

4. A method according to claim 1, wherein said step (c) comprises moving the element away from the hub at a rate of less than approximately 0.0004 inches per revolution of the disk.

5. A method of centering a disk on the rotational axis of a motor, the motor including a hub, the disk having an outer diameter and an inner diameter, defining a center hole, comprising the sequential steps of:
    (a) loosely fixing the disk to the hub so that a portion of the hub protrudes into the center hole of the disk;

(b) placing a contact element in contact with the outer diameter of the disk;

(c) moving the contact element towards the rotational axis of the motor until a portion of the edge of the center hole of the disk contacts the protruding portion of the hub;

(d) simultaneously rotating the disk and the hub and moving the contact element away from the rotational axis of the motor until the rotating element no longer contacts the disk, thereby centering the disk on the rotational axis of the motor; and (e) securely fixing the disk to the support surface of the hub.

6. A method according to claim 5, wherein said step (d) comprises moving the rotating element away from the rotational axis of the motor at a rate of R inches per revolution, where R is approximately equal to or less than the desired runout of the outer diameter of the disk.

7. A method according to claim 5, wherein said step (d) comprises moving the rotating element away from the rotational axis of the motor at a rate equal to or less than approximately 0.0004 inches per revolution of the disk.

8. A method of centering a disk on the rotational axis of a motor, the motor including a hub having a disk support surface, the disk having an outer diameter and an inner diameter, the inner diameter defining a center hole, comprising the sequential steps of:

(a) loosely fixing the disk to the support surface of the hub so that a portion of the hub protrudes into the center hole of the disk;

(b) placing a rotating element in contact with the outer diameter of the disk;

(c) moving the rotating element towards the rotational axis of the motor after said step (b) until a portion of the edge of the center hole of the disk contacts the protruding portion of the hub;

(d) simultaneously rotating the disk and the hub and gradually increasing the distance between the rotating element and the rotational axis of the motor at a linear rate of R inches per revolution, where R is approximately equal to or less than the desired runout of the outer diameter of the disk, until the rotating element no longer contacts the disk; and (e) securely fixing the disk to the support surface of the hub.

9. An apparatus for centering a disk on the rotational axis of a motor having a hub protruding into a center hole of the disk, the disk being loosely fixed to the hub and having an outer diameter and an inner diameter defining the center hole, comprising:

first means for contacting the outer diameter of the disk; and second means for moving said first means toward the rotational axis of the motor until the inner diameter of the disk contacts the hub and for simultaneously rotating the disk and the hub and moving said first means away from the rotational axis of the motor at a rate related to the rotational velocity of the disk.

10. An apparatus according to claim 9, wherein said second means moves said first means away from the hub at a linear rate of R inches per revolution where R is approximately equal to or less than the desired runout of the outer diameter of the disk.

11. An apparatus for centering a disk on the rotational axis of a motor mounted to the base plate of a disk drive, the motor including a hub, the disk having an outer diameter and an inner diameter defining a center hole, comprising:

first means for locating and supporting the base plate and the motor;

second means for contacting the outer diameter of the disk;

third means, provided on said first means, for rotating the motor and the hub at a selected rotational velocity; and fourth means, provided on said first means, for moving said second means toward the rotational axis of the motor until the inner diameter of the disk contacts the hub and for moving said second means away from the rotational axis of the motor at a rate related to the rotational velocity of the disk.

12. An apparatus according to claim 11, further comprising fifth means for controlling said third and fourth means to operate at related speeds.

13. An apparatus according to claim 12, wherein said fifth means controls said third and fourth means so that said fourth means moves away from the hub at a linear rate of R inches per revolution of the hub and disk, where R is approximately equal to or less than the desired runout of the outer diameter of the disk.

14. An apparatus according to claim 12, further comprising bearings provided on said first means, wherein:

said fourth means comprises a shaft having a first portion rotatably supported by said bearings and a second portion eccentric with respect to said first portion; and said second means is mounted on said second portion of said shaft.

15. An apparatus according to claim 14, wherein said third means comprises:

a drive head; and a drive arm having said drive head mounted thereon, said drive arm being attached to said support means so that said drive arm moves between a position where said drive head engages the hub and a position where said drive head is disengaged from the hub.

16. An apparatus for centering a disk on the rotational axis of a motor mounted to the base of a disk drive, the motor including a hub, the disk having an outer diameter and an inner diameter defining a center hole, comprising:

first means for locating and supporting the base plate and the motor;

second means for contacting the outer diameter of the disk;

a drive unit;

a drive head rotated by said drive unit;

a drive arm, having said drive head mounted thereon, for rotating the hub and the disk, said drive arm being attached to said first means so that said drive arm moves between a position where said drive head engages the hub and a position where said drive head is disengaged from the hub; and third means, provided on said first means and mechanically connected to said drive unit, for moving said first means towards the rotational axis of the motor until the inner diameter of the disk contacts the hub and for moving said second means away from the rotational axis of the motor at a rate of R inches per revolution of the hub and disk, where R is approximately equal to or less than the desired runout of the outer diameter of the disk.

17. An apparatus according to claim 16, wherein:

said third means comprises a shaft having first portion rotatably supported by said bearings and a second portion eccentric with respect to the first portion; and said second means is mounted on said second portion of said shaft.

* * * * *